US006330997B2

(12) United States Patent
McGlaun et al.

(10) Patent No.: US 6,330,997 B2
(45) Date of Patent: Dec. 18, 2001

(54) LIFTING APPARATUS FOR SMALL VEHICLES

(76) Inventors: Vinson L. McGlaun, 2709 Hillside La., Augusta, GA (US) 30909; Larry D. Stockdaile, 5314 Woodland Dr., Grovetown, GA (US) 30813

( * ) Notice: Subject to any disclaimer, the term of this patent is extended or adjusted under 35 U.S.C. 154(b) by 0 days.

(21) Appl. No.: 09/811,202

(22) Filed: Mar. 16, 2001

Related U.S. Application Data

(60) Provisional application No. 60/190,252, filed on Mar. 17, 2000.

(51) Int. Cl.[7] .................................................... F16M 13/00

(52) U.S. Cl. ................................................ 254/94; 254/88

(58) Field of Search ................................ 254/94, 422, 88

(56) References Cited

U.S. PATENT DOCUMENTS

| | | |
|---|---|---|
| 1,408,408 | 2/1922 | Scott . |
| 2,415,018 | 1/1947 | McDonald . |
| 2,556,929 | 6/1951 | Mervine . |
| 3,326,525 | 6/1967 | Kauppi . |
| 3,779,517 | 12/1973 | Fisher . |
| 4,082,250 | 4/1978 | Allmon et al. . |
| 4,238,114 | 12/1980 | Migliorati . |
| 4,549,721 | 10/1985 | Stone . |
| 4,993,685 | 2/1991 | Sparling . |
| 5,000,423 | 3/1991 | Snickers . |
| 5,118,081 * | 6/1992 | Edelman ............................... 254/88 |
| 6,053,477 * | 4/2000 | Price ..................................... 254/94 |

* cited by examiner

*Primary Examiner*—Robert C. Watson
(74) *Attorney, Agent, or Firm*—Maria Reichmanis

(57) ABSTRACT

A lifting apparatus for small vehicles, including a frame assembly, a pair of fabric webs attached to the frame assembly, and a pivotable lift assembly with a pair of spaced-apart wheel holders for receiving and securing the forward wheels of a vehicle such as a lawn or garden tractor, golf cart, or the like. To use the apparatus, the operator positions the wheels of the vehicle on the webs, operably positions the forward wheels in the wheel holders, then drives the vehicle over the webs while the lift assembly pivots upwards. The weight of the vehicle holds the webs in place on the ground, thereby causing the frame and lift assemblies to lift and pivot, raising the apparatus from a first stable position (the "down" position) to a second stable position (the "up" position) where the undercarriage of the vehicle is accessible for servicing and maintenance.

33 Claims, 4 Drawing Sheets

LIFTING APPARATUS FOR SMALL VEHICLES

This application claim benefit to U.S. provisional application Ser. No. 60/190,252, filed Mar. 17, 2000.

BACKGROUND OF THE INVENTION

1. Field of the Invention

The present invention relates generally to apparatus for lifting small vehicles such as riding mowers, lawn and garden tractors, all-terrain vehicles, and the like. In particular, the present invention relates to a simple, rugged apparatus for engaging and lifting one end of a small vehicle into an elevated position that allows a mechanic to safely access the undercarriage of the vehicle.

2. Discussion of Background

Small tractors—riding mowers, lawn tractors, garden tractors, and like vehicles—are becoming increasingly popular among homeowners as well as lawn care professionals. These small vehicles are used for cutting grass and brush, removing debris, tilling soil, plowing snow, and assorted hauling tasks around gardens, parks, and small farms.

Like their larger counterparts, these vehicles require routine servicing such as lubrication and/or oil changes, battery replacement, and removal and replacement of mower blades and other parts (belts, filters, etc.). Many of these tasks require access to the undercarriage of the vehicle, which is difficult due to the generally low clearance and correspondingly limited access space. For many vehicular service and maintenance procedures, it is advantageous to lift one end of the vehicle (or even the entire vehicle) above ground level so as to give the mechanic more clearance and better access to the undercarriage.

Riding mowers and other small tractors typically weigh at least 150 kg or more, so they are virtually impossible to lift into an elevated position unaided. Conventional automobile jacks are not suitable, because these are not designed to be used safely with smaller vehicles such as riding mowers. Similarly, ramps designed for use with automobiles have the wrong tilt angles for use with smaller vehicles. Tractor dealers and professional mechanics have suitable lift equipment and/or garages with oil pits for servicing vehicles; however, few individual homeowners or even lawn care professionals have access to oil pits or safe, reliable lifts.

Some operators simply tip a small tractor onto its side in order to expose the undercarriage; however, this practice is not recommended due to the unstable position of the tractor and the possibility of losing oil and other fluids from the engine compartment. Without a safe way to access the undercarriage, safety-conscious homeowners (and other users) must take their small tractors to a dealer or a professional mechanic for even such simple tasks as oil changes. This problem is also experienced by the owners and operators of golf carts and other small motorized vehicles.

Many different types of vehicular lifts, ramps, and other devices are available to consumers. A common problem with ramps is stability: unless the ramps are secured, they may shift when a vehicle is driven onto (or off) the ramps. One approach to stabilizing ramps is to add a fabric web that extends outwards from the ramp. In U.S. Pat. No. 5,118,081, Edelman discloses this type of inclined vehicular ramp, where the weight of the vehicle on the fabric web holds the web in position; the web in turn secures and positions the ramps to prevent them from sliding while the vehicle is being driven on (or off). Sparling's automotive ramps (U.S. Pat. No. 4,993,685) also include webs that extends forwardly of the ramps to align and secure them in position.

Snickers (U.S. Pat. No. 5,000,423) provides a small vehicle lift with a pair of ramps, each ramp including an angled portion and a pivotably mounted, user-operated lever which pulls the vehicle up the ramp. The lift is secured to the vehicle by straps, and can be folded for storage. Migliorati's rocking platform (U.S. Pat. No. 4,238,114) includes a pair of parallel longitudinal rails for supporting a vehicle, a pair of ramps, and a dihedron-shaped base with two bearing planes, one parallel to the support surface and the other inclined with respect to the surface. The platform can be rocked from a horizontal position (where the supporting structure rests on the parallel bearing plane) to an inclined position (where it rests on the inclined plane).

Fisher's frame and jack assembly (U.S. Pat. No. 3,779,517) includes a pair of pivotable ramps and raised ends to help keep the vehicle in position. The frame is raised and lowered by a hydraulic lift. The Mervine and Scott devices (U.S. Pat. No. 2,556,929 and 1,408,408, respectively) also include fixed and pivotable portions; Scott's workbench has a stop at one end to prevent a motorcycle from rolling forwards. Kauppi (U.S. Pat. No. 3,326,525) discloses a tilt up ramp with two legs and a stop. The ramp has two stable positions, one where the ramp is inclined and one where it is parallel to the ground. One of the legs acts as a fulcrum to pivot the ramp from the inclined position to the parallel position as the vehicle is driven onto it.

Additional types of lifting devices are shown by McDonald (U.S. Pat. No. 2,415,018), Stone (U.S. Pat. No. 4,549,721), and Allmon, et al., (U.S. Pat. No. 4,082,250). McDonald shows a device with a ramp and a curved saddle for engaging the axle of the vehicle. Stone describes a portable jack with a base frame having a pair of pivotable lifter arms that engage and lift the chassis of a riding mower. The arms are operated by an upwardly extending screw-actuated scissors jack. Allmon, et al. provide a lifting apparatus that allows one person to lift objects such as truck camper covers, boats, and mowers. The apparatus includes a vertical support with pair of inclined braces; a pivotable L-shaped support is mounted to the vertical support.

Despite the variety of vehicular ramps and lifts that are available to consumers, there is no known lifting apparatus that is suitable for use with small vehicles such as riding mowers, that can be readily adjusted for use with different sizes, models, and types of vehicles, and that is safe, easy to use, and reliable. There is a need for a vehicular lifting apparatus that is straightforward and cost-effective to manufacture, and that can be adjusted for use with a variety of different small vehicles.

SUMMARY OF THE INVENTION

According to its major aspects and broadly stated, the present invention is a lifting apparatus for small motorized vehicles, including vehicles such as riding mowers, lawn tractors, garden tractors, golf carts, and the like. The apparatus includes a frame assembly, a pair of spaced-apart webs attached to the frame assembly, and a lift assembly for receiving and securing the forward wheels of the vehicle.

When the apparatus is positioned for use, the frame assembly is in a first stable position (the "down" position), and the lift assembly is in a first, "down" position with the webs on the ground and extending forwards of the frame assembly. To lift the forward end of the vehicle, the operator drives the vehicle onto the webs, adjusts the lift assembly, then drives the vehicle forwards over the webs. The weight of the vehicle holds the webs in place on the ground as the vehicle is driven forwards, thereby causing the frame and lift assemblies to pivot, moving the frame assembly into a second stable position (the "up" position") where the forward end of the vehicle is raised and its undercarriage is accessible for servicing and maintenance.

An important feature of the present invention is the frame assembly which carries the lift assembly and the webs. For safe operation, the frame assembly has two stable positions: a first, "down" position where a vehicle can easily be positioned for lifting, and a second "up" position where one end of the vehicle is raised above ground level to a height where the undercarriage is readily accessible. The frame assembly is preferably made of rugged, durable materials such as steel, stainless steel or cast aluminum that are capable of holding the weight of the vehicles to be used therewith. The dimensions of the frame assembly can be tailored to the particular vehicles to be used therewith; alternatively, the height of the frame assembly, its width, and the dimensions and configuration of the lift assembly, can be made adjustable so that the apparatus can be used with differently-sized vehicles.

Another important feature of the present invention is the lift assembly, which in one preferred embodiment includes a pair of spaced-apart ramps with cradles shaped and dimensioned for receiving and holding the forward wheels of the vehicle. (For purposes of this specification, the terms "forward end" and "forward wheels" refer to whichever end of the vehicle (with its wheels) is to be raised. A lifting apparatus according to the present invention is typically used to lift the front end of a vehicle. However, it should be understood that some vehicles can also be backed onto the apparatus to lift the back end.)

The ramps allow an operator to easily drive a vehicle such as a small tractor into a position where the forward wheels rest securely in the cradles; a wheel lock prevents the wheels from accidentally moving out of the cradles. Once the forward wheels are in the cradles, the operator slowly drives the vehicle forwards (with the rearward wheels on the webs), the cradles and the frame assembly pivot from the first to the second stable position, thereby lifting the forward end of the vehicle towards the "up" position. When the frame assembly reaches its second stable position, the operator sets the brakes, turns off the engine and (preferably) secures the rear wheels with chocks or other suitable devices, engages the safety locks, and proceeds to perform the desired vehicular service or maintenance tasks. When work is complete, the operator removes the wheel chocks and disengages the safety locks, then backs the vehicle downwards: the cradles and the frame assembly pivot downwards to the first stable position to return the vehicle to the ground.

In another preferred embodiment of the invention, the lift assembly includes a pivotable transverse bar with pair of spaced-apart chains for securing the front wheels or frame of a zero-turn-radius ("ZTR") vehicle to the frame assembly. Once the front wheels or frame are secured, the operator simply drives the vehicle forwards on the webs (as in the first embodiment, the weight of the vehicle holds the webs in place on the ground, thereby helping prevent accidental shifting and maintaining the apparatus in position). The frame assembly (and the lift assembly) pivot from the first stable position to the second stable position, lifting the forward end of the vehicle to the "up" position. When the vehicle is placed in reverse, the frame and lift assemblies pivot in the reverse direction to return the front end of the vehicle to the ground.

The webs constitute another feature of the present invention. The webs, which help maintain the position of the apparatus during use, ensure that neither the apparatus nor the vehicle shift accidentally while the vehicle is being driven onto (or off) the apparatus. The webs may be of any suitable material, including but not limited to natural or artificial rubber, plastic, or composition sheeting, fabric, rubber-impregnated fabric, and so forth.

Still another feature of the present invention is its simplicity, versatility, and cost-effectiveness. The lifting apparatus is made of readily-available materials (metal sheeting and tubing, fabric webs, etc.); the various components are assembled by welding or with suitable fasteners (cotter pins, bolts, screws, etc.). Thus, the apparatus is inexpensive to manufacture and affordable by individual homeowners as well as professional mechanics. It is rugged, adaptable to a wide range of vehicles (including ZTR vehicles), easy to use, and allows for safe and easy access to the undercarriage of a vehicle such as a riding lawn mower or lawn tractor.

Other features and advantages of the present invention will be apparent to those skilled in the art from a careful reading of the Detailed Description of Preferred Embodiments presented below and accompanied by the drawings.

DETAILED DESCRIPTION OF PREFERRED EMBODIMENTS

Figure 1A:
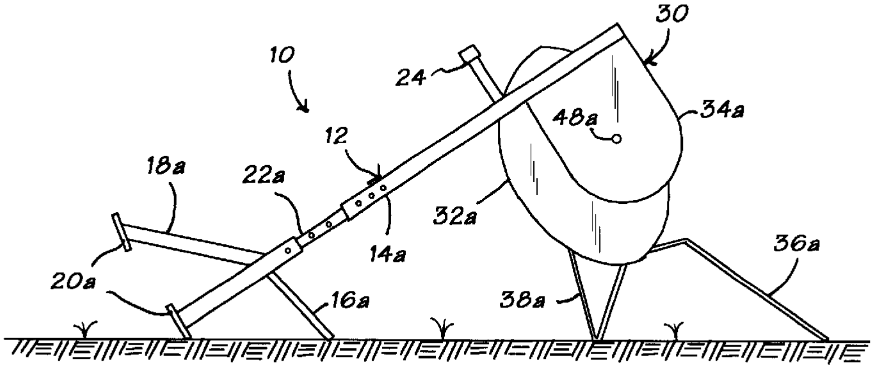
FIG. 1A is a side view of a vehicular lifting apparatus according to a preferred embodiment of the present invention, showing the apparatus in a first stable position.

In the following detailed description of the invention, reference numerals are used to identify structural elements, portions of elements, surfaces or areas in the drawings, as such elements, portions, surfaces or areas may be further described or explained by the entire written specification. For consistency, whenever the same numeral is used in different drawings, it indicates the same element, portion, surface or area as when first used. Unless otherwise indicated, the drawings are intended to be read together with the specification, and are to be considered a portion of the entire written description of this invention as required by 35

U.S.C. §112. As used herein, the terms "horizontal," "vertical," "left," right," "up," "down," as well as adjectival and adverbial derivatives thereof, refer to the relative orientation of the illustrated structure as the particular drawing figure faces the reader.

Referring now to FIGS. 1A–D, there is shown a vehicular lifting apparatus 10 according to a preferred embodiment of the present invention. Apparatus 10 includes a frame assembly 12 with generally vertical, parallel side supports 14*a*, 14*b* made of metal tubing, front locks 16*a*, 16*b*, rear supports 18*a*, 18*b*, and base plates 20*a*, 20*b*. (Either or both of supports 14*a*, 14*b* and 18*a*, 18*b* may terminate in base plates 20*a*, 20*b*.) Supports 18*a*, 18*b* are angled at approximately 45° to supports 14*a*, 14*b*; however these angles may vary. Supports 18*a*, 18*b* and plates 20*a*, 20*b* may be welded to supports 14*a*, 14*b*; alternatively, these components may be attached by pins, bolts, or other suitable fasteners. Locks 16*a*, 16*b* may be made removable or adjustable, that is, the locks can be used if desired for added stability of frame assembly 12, moved out of the way if preferred, or removed entirely.

For adjusting the height of frame assembly 12, supports 14*a*, 14*b* may include any sturdy telescoping mechanisms that allow the operator to adjust the height of the supports to a selected position. For example, a pair of shafts 22*a*, 22*b* may be slidable in supports 14*a*, 14*b*, lockable in any of a plurality of user-selectable positions by cotter pins, clevis pins, bolts, or other suitable fasteners. Detents may be suitable for light-weight applications; however, fasteners that provide more security against accidental dislodging are generally preferred.

At least one transverse bar 24 and a base plate 26 connect supports 14*a*, 14*b*, attached to the supports by welding, bolts, or other means. Base plate 26 may be integral with plates 20*a*, 20*b* if convenient. Bar 24 may be fixed in length; alternatively, bar 24 may be adjustable by the same type of mechanism used to adjust the height of frame assembly 12 (or indeed any other suitable type of mechanism). For an adjustable-length bar 24, it will be evident that base plate 26 is preferably bifurcated rather than a unitary structure; alternatively, the length of the base plate may also be adjustable.

Figure 2A:
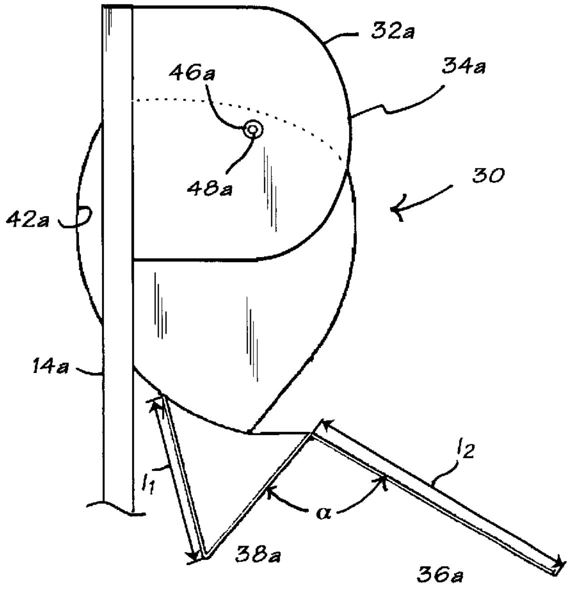
FIG. 2A is a side, detail view of the lift assembly of FIG. 1A.
Figure 2B:
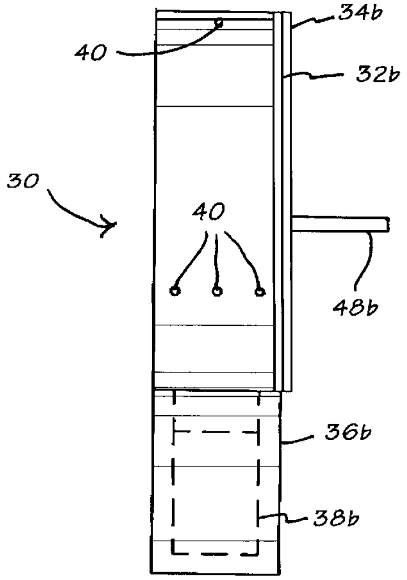
FIG. 2B is a front, detail view of the lift assembly of FIG. 1A.

A lift assembly 30 includes a pair of generally planar, parallel, spaced-apart side walls 32*a*, 32*b* to which are mounted cradles 34*a*, 34*b*, respectively (FIGS. 2A and 2B). Ramps 36*a*, 36*b* and supports 38*a*, 38*b* are attached to the cradles. Cradles 34*a*, 34*b* are attached to a transverse bar 56 by bolts, screws, or other suitable fasteners 40; alternatively, other techniques such as welding may be used. Side walls 32*a*, 32*b* and the walls of cradles 34*a*, 34*b* may be of any desired shapes.

Floors 42*a*, 42*b* of cradles 34*a*, 34*b*, which extend from ramps 36*a*, 36*b*, are curved generally as shown in FIG. 2A, providing a curved receptacle that receives and holds the forward wheels of a vehicle therein. The width and radius of curvature of floors 42*a*, 42*b* are selected in view of the dimensions of the wheels of vehicles to be used with apparatus 10: it is anticipated that cradles 34*a*, 34*b* (and also ramps 36*a*, 36*b*) will be at least approximately as wide as the wheels, and that a third or more of the circumference of each wheel will be encompassed by a cradle. However, somewhat narrower ramps may also be useful. Side walls 44*a*, 44*b* of cradles 34*a*, 34*b* are pivoted to walls 32*a*, 32*b* at 46*a*, 46*b* by pivot connectors 48*a*, 48*b*, respectively.

If desired, ramps 36*a*, 36*b* may include spaced-apart traction ribs, textured surfaces, or other features for improving traction between the ramps and the wheels of a vehicle. Ramps 36*a*, 36*b* may be attached to floors 42*a*, 42*b* by hinges 50*a*, 50*b*; alternatively, the ramps may be attached to floors 42*a*, 42*b* by welding, brazing, or other suitable technique. Ramps 36*a*, 36*b* may also be integrally formed with supports 38*a*, 38*b* or floors 42*a*, 42*b*.

Figure 1B:
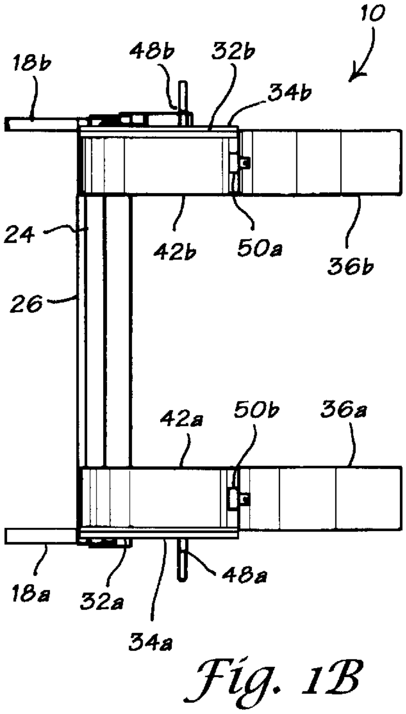
FIG. 1B is a top view of the apparatus of FIG. 1A.
Figure 1C:
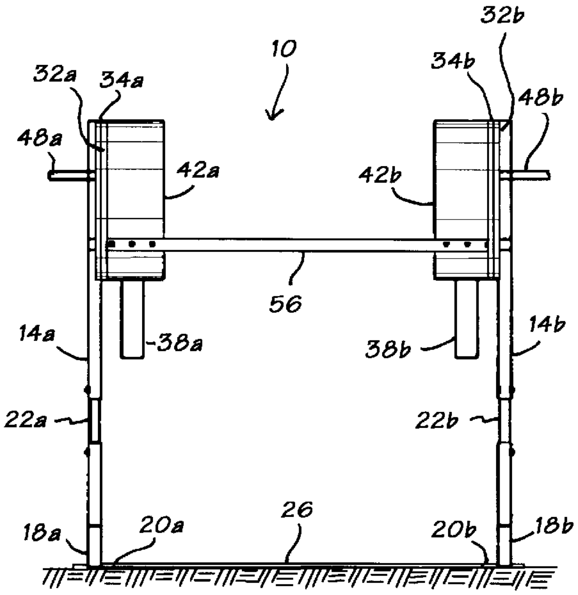
FIG. 1C is a rear view of the apparatus of FIG. 1A.
Figure 1D:
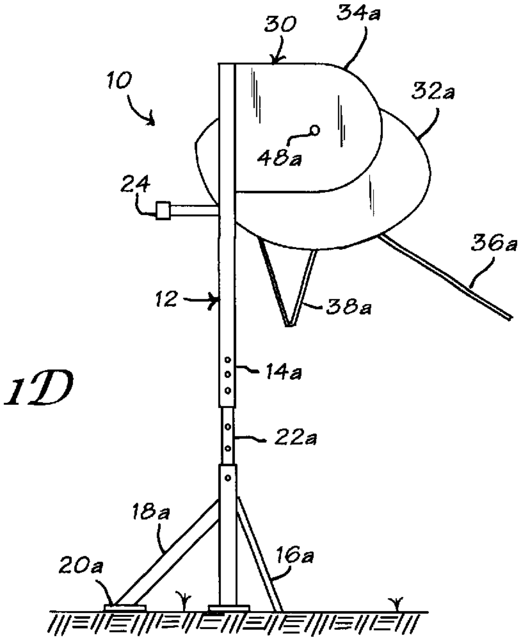
FIG. 1D is a side view of the apparatus of FIG. 1A in a second stable position.
Figure 3:
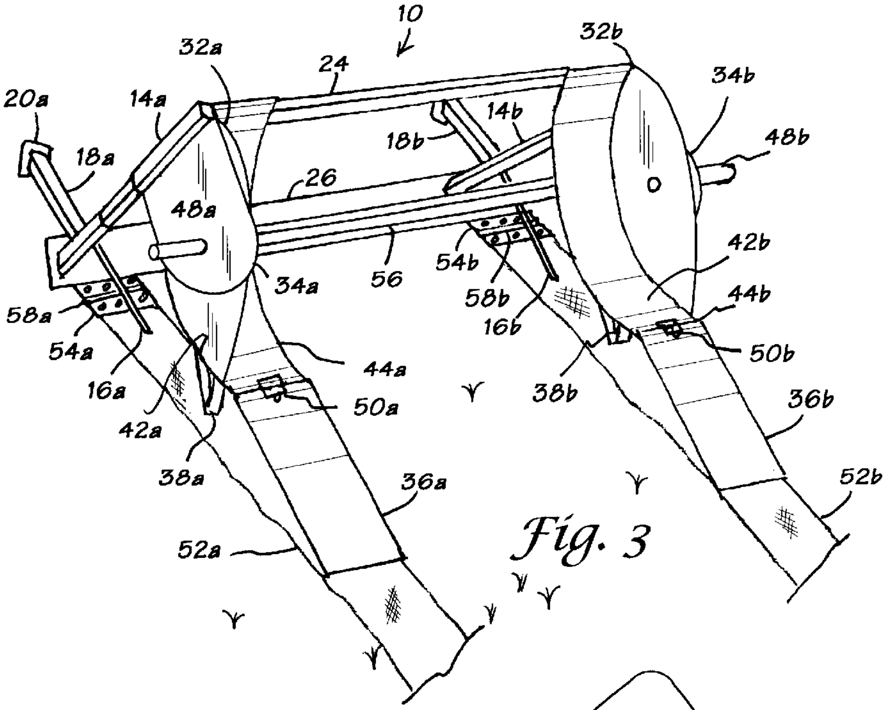
FIG. 3 is a front perspective view of the apparatus of FIG. 1A in the first stable position, with the lift assembly and ramps in the "down" position.

Cradles 34*a*, 34*b* are attached to the ends of transverse bar 56 generally as shown in FIGS. 1C and 3 (in the position shown in FIG. 1B, bar 56 is directly underneath bar 24). Cradles 34*a*, 34*b* may be attached to bar 56 by welding, or by fasteners 40 (such as screws, nuts and bolts, or the like). During use of apparatus 10, bar 24 remains fixed in position with respect to frame assembly 12, while bar 56 pivots with cradles 34*a*, 34*b*. Like above-described bar 24, bar 56 may be fixed in length or adjustable by any convenient mechanism.

Apparatus 10 has two stable positions. In the first stable position (FIG. 1A), supports 14*a*, 14*b* rest on the ground, and lift assembly 30 is in a "down" position with the ends of ramps 36*a*, 36*b* on the ground. In a second stable position (FIG. 1D), supports 18*a*, 18*b* and supports 14*a*, 14*b* are on the ground, and lift assembly 30 is in the "up" position with the ends of ramps 36*a*, 36*b* above ground.

Figure 4:
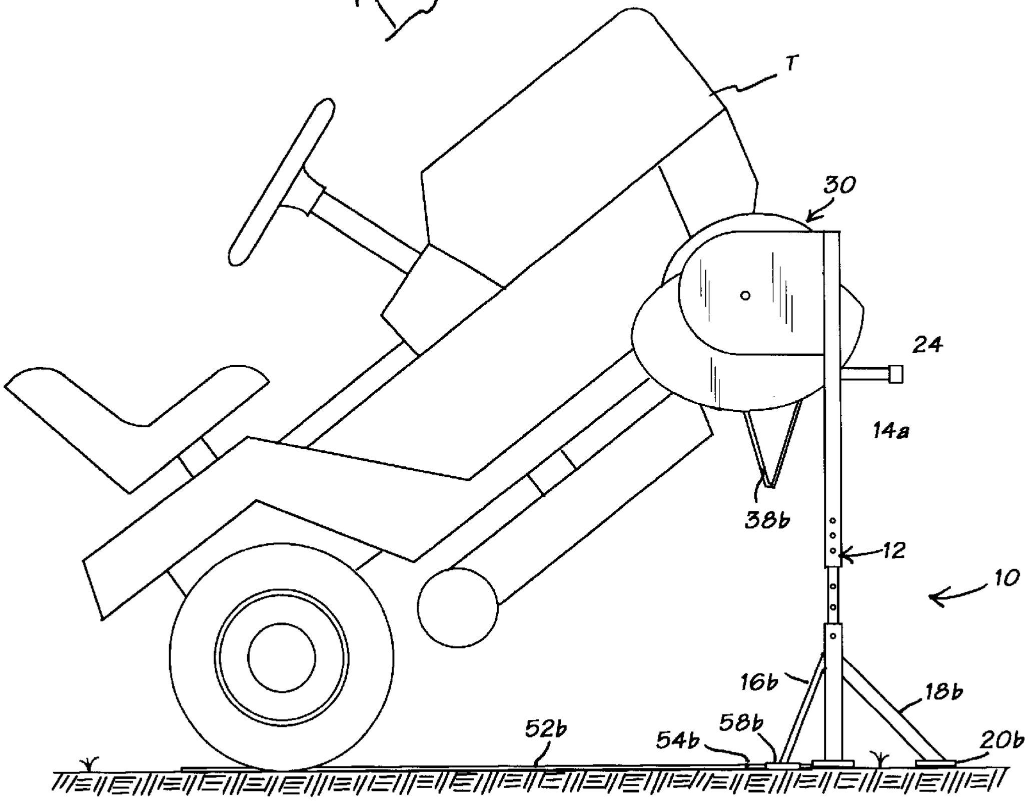
FIG. 4 is a side view of the apparatus of FIG. 1A in use, with the apparatus in the second stable position and the lift assembly in the "up" position.

Webs 52*a*, 52*b* are attached to base plate 26 so as to underlie the plate and ramps 36*a*, 36*b* (FIGS. 3 and 4). Webs 52*a*, 52*b* are typically about 6'–8' (183–244 cm) long; however, different lengths may also be useful depending on the dimensions of the vehicles to be used with apparatus 10. Webs 52*a*, 52*b* may be attached directly to plate 26. Alternatively, the webs may be attached to mounting plates 54*a*, 54*b*, which are pivotably attached to plate 26, or rotatably mounted in and dispensed from web rolls such as are known in the art. The webs may be of any sturdy, durable, natural or synthetic materials, including but not limited to rubber or plastic sheeting, sturdy fabric, and rubber or plastic-coated or impregnated fabrics.

The components of apparatus 10 are made of sturdy, rugged and durable materials. Frame assembly 12, bars 24, and 38, locks 16*a*, 16*b* (if present), and supports 18*a*, 18*b* may be made of steel tubing. Walls 32*a*, 32*b*, 44*a*, 44*b*, ramps 36*a*, 36*b*, floors 42*a*, 42*b*, and base plate 26 may be made of steel sheet. However, other materials such as brass, aluminum, cast aluminum, composites, and plastics (including self-repairing plastics) may also be useful. Apparatus 10 may be made of any materials that are capable of supporting the weight of the vehicles to be used therewith.

The dimensions of the various components of apparatus 10 are selected so that the apparatus is usable with riding mowers, lawn tractors, or other such vehicles. Thus, the weight and dimensions of the apparatus depend on the vehicles with which it will be used. For example, for use with typical riding mowers, apparatus 10 may be made of 1"–1¼" (about 2.54–3.18 cm) round or square steel tubing having walls approximately ⅛" (0.32 cm) thick, for a typical overall weight of 80–120 pounds (about 36–54 kg). An apparatus 10 with a width of 40"–55" (about 102–140 cm), a height of 35"–45" (about 89–114 cm), and a length of 20"–25" (about 51–64 cm) would accommodate most presently-available riding mowers. A length $l_1$ of supports 38*a*, 38*b* may be approximately 8" (20 cm), and a length $l_2$ of ramps 36*a*, 36*b* may be approximately 12"–15" (15–40 cm). An angle $\alpha$ between supports 38*a*, 38*b* and ramps 36*a*, 36*b* is typically somewhat greater than 90°. However, the optimum dimensions, arrangement, and configurations of these and other components of apparatus 10 are best determined in view of the vehicles with which the apparatus will be used. The invention is further illustrated by the following nonlimiting example.

EXAMPLE

An apparatus 10 was constructed of 1" (2.54 cm) and 1¼" (3.18 cm) square steel tubing having a wall thickness of ⅛" (0.32 cm). The weight of apparatus 10 was 93 lbs. (about 42 kg). The overall width of the apparatus was adjustable between 46"–53" (about 117–135 cm); the overall height was adjustable between a low setting of 36–¼" (about 92 cm) and a high setting of 40–¼" (about 102 cm). Ramps 36*a*, 36*b* and webs 34*a*, 34*b* were 6" (about 15 cm) wide; webs 52*a*, 52*b* were 8' (about 244 cm) long.

When the height of apparatus 10 was at the lowest setting, the apparatus could be operated to lift the forward end of a typical riding mower to a position where the front wheels were 20–½" (52 cm) above ground. When the height was adjusted to the highest setting, the front wheels were 24–½" (62 cm) above ground.

In operation, apparatus 10 is placed in the first stable position shown in FIGS. 1A and 3, with lift assembly 30 and cradles 34*a*, 34*b* in a first, "down" position. Ramps 36*a*, 36*b* rest on webs 52*a*, 52*b*, respectively, with the webs extending forwards of the ramps; the ends of locks 16*a*, 16*b* also rest on the webs.

The operator drives a vehicle such as a small tractor T into position with the tractor wheels on webs 52*a*, 52*b*. Then, he or she drives the tractor T slowly forwards over webs 52*a*, 52*b* onto ramps 36*a*, 36*b*, and proceeds upwards until the forward wheels of the tractor rest in cradles 34*a*, 34*b*. The weight of tractor T holds webs 52*a*, 52*b* in place on the ground, therefore, the forward motion of the tractor causes lift assembly 30 with cradles 34*a*, 34*b* to pivot, placing apparatus 10 into a second stable position (the "up" position of FIGS. 1D and 4) while the weight of the tractor on webs 52*a*, 52*b* secures the apparatus and deters accidental shifting. As lift assembly 30 pivots into the second stable position, locks 16*a*, 16*b* move into corresponding grooves 58*a*, 58*b* to help secure apparatus 10 and tractor T in position. The weight of tractor T on webs 52*a*, 52*b* maintains ramps 36*a*, 36*b* in alignment with the forward wheels of the tractor to prevent inadvertent displacement of the ramps. Once frame assembly 12 is in the second stable position with lift assembly 30 in the "up" position, supports 18*a*, 18*b* prevent apparatus 10 from being pushed backwards. In addition, one or both of the forward wheels of tractor T may be secured to apparatus 10 by bungie cords (not shown); one or both of the rearward wheels may be chocked for added stability. If desired, one or both of the forward wheels of tractor T may be locked to its corresponding cradle by any suitable locking device.

Apparatus 10 holds tractor T securely in the raised, "up" position shown in FIG. 4, allowing the operator to safely access the underside of the tractor to swap out mower blades, replace spark plugs or drive belts, and perform other necessary maintenance tasks. When the work is completed, the operator simply disengages locks 16*a*, 16*b* and backs tractor T slowly so that the shifting weight of the tractor causes lift assembly 30 with cradles 34*a*, 34*b* to pivot downwards, returning apparatus 10 to its first stable position and re-positioning the rearward end of the tractor onto the ground. He then backs tractor T out of cradles 34*a*, 34*b* and down ramps 36*a*, 36*b*, returning the tractor to the ground.

Figure 5:
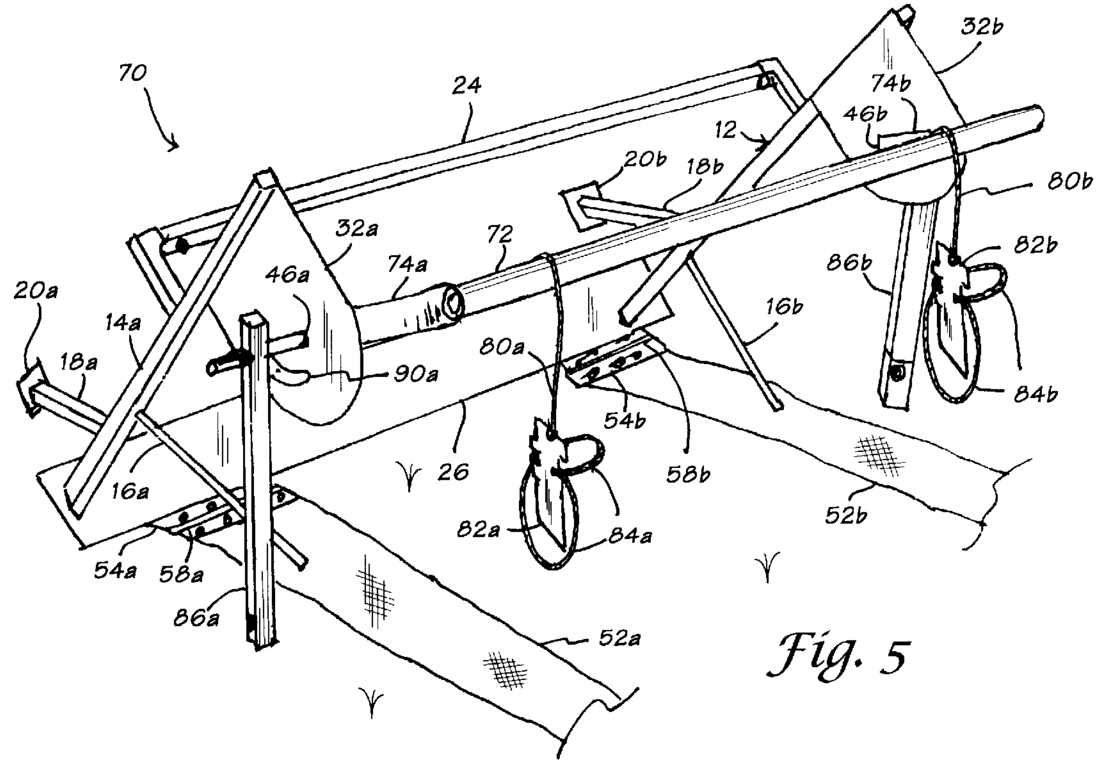
FIG. 5 is a front, perspective view of a vehicular lift apparatus according to another preferred embodiment of the present invention, showing the frame assembly in the first stable position.

Another preferred embodiment of the present invention is shown in FIG. 5. A vehicular lifting apparatus 70, like above-described apparatus 10, includes a frame assembly 12 with generally vertical, parallel side supports 14*a*, 14*b*, locks 16*a*, 16*b*, rear supports 18*a*, 18*b*, base plates 20*a*, 20*b*, at least one transverse bar 24, and a base plate 26. The dimensions of frame assembly 12 may be fixed; alternatively, these may be adjustable by providing adjustable supports 14*a*, 14*b*, an adjustable bar 24, a bifurcated or adjustable-length base plate 26, or any combination of these as described above for apparatus 10.

Lift assembly 30 includes a pair of generally planar, parallel, spaced-apart side walls 32*a*, 32*b* attached to supports 14*a* 14*b*, respectively, generally as shown. Side walls 32*a*, 32*b* may be welded to supports 14*a*, 14*b*; alternatively, fasteners such as screws, nuts and bolts, or the like may be used. A transverse bar 72 carries spaced-apart arms 74*a*, 74*b* pivoted to side walls 32*a*, 32*b* at 46*a*, 46*b* by any suitable connectors. Arms 74*a*, 74*b* may be welded, bolted, or otherwise secured to bar 72; alternatively, bar 72 and arms 74*a*, 74*b* may be integrally formed. A pair of adjustable front supports 86*a*, 86*b* are attached to side walls 32*a*, 32*b*, generally as shown.

Webs 52*a*, 52*b* are attached to base plate 26 via mounting plates 54*a*, 54*b*, extending forwards of plate 26 as shown in FIG. 5. Alternatively (as for abovedescribed apparatus 10), the webs may be rotatably mounted in and dispensed from web rolls such as are known in the art.

Spaced-apart ropes or chains 80*a*, 80*b* are attached by bar 72 by welding or other suitable technique. Chains 80*a*, 80*b* carry wheel plates 82*a*, 82*b* with retainers 84*a*, 84*b*. Bar 24 remains fixed in position with respect to frame assembly 12 during use of apparatus 70, while bar 72 pivots in channels 90*a*, 90*b* as the apparatus moves from a first stable position (shown in FIG. 5) to a second stable position wherein front supports 86*a*, 86*b* are above ground level while side supports 14*a*, 14*b* and rear supports 18*a*, 18*b* rest on the ground and front locks 16*a*, 16*b* rest in grooves 58*a*, 58*b*. Like above-described bar 56, bar 72 may be fixed in length or adjustable by any convenient mechanism.

The dimensions of the various components of apparatus 70, like those of apparatus 10, are selected so that the apparatus is usable with riding mowers, lawn tractors, or other such vehicles. Apparatus 70, like above-described apparatus 10, is made of rugged, durable materials, preferably steel although brass, aluminum, cast aluminum, composites, and plastics (including self-repairing plastics) may also be useful.

Figure 6:
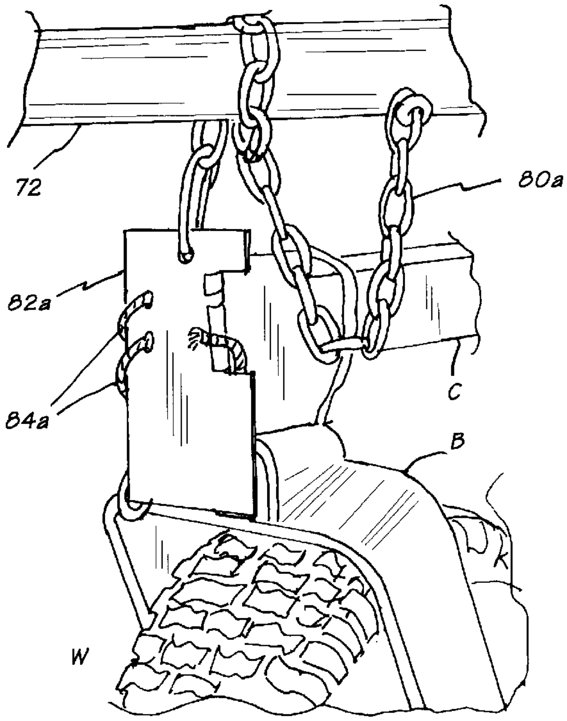
FIG. 6 is a detail, perspective view showing a wheel plate of the apparatus of FIG. 5 in use.

In operation, apparatus 70 is placed in the first stable position with webs 52*a*, 52*b* extending forwards of frame assembly 12 and lift assembly 30, and locks 16*a*, 16*b* resting on the webs. The operator drives a vehicle (such as a ZTR mower) onto webs 52*a*, 52*b*, stops the vehicle, secures the forward wheels to lift assembly 30 using ropes or chains 80*a*, 80*b*, and secures the wheels with wheel plates 82*a*, 82*b* and retainers 84*a*, 84*b*. FIG. 6 shows wheel plate 82*a* secured to a mounting bracket B and cross-bar C of a wheel W. Alternatively, ropes or chains 80*a*, 80*b* may be used to secure the frame of the vehicle to lift assembly 30.

The operator then drives slowly forwards, causing frame assembly 12 and lift assembly 30 to pivot forwards, lifting the forward end of the vehicle into the "up" position while the weight of the vehicle on webs 52*a*, 52*b* secures and positions the apparatus with the vehicle to prevent inadvertent displacement. Forward motion stops when frame assembly 12 is in its second stable position, with rear supports 18*a*, 18*b* resting on the ground and lift assembly 30 in its "up" position. Locks 16*a*, 16*b* rest in grooves 58*a*, 58*b*, helping maintain the vehicle and apparatus 70 in the second stable position. One or both of the rearward wheels of the vehicle may be chocked for added stability.

With apparatus 70 thus positioned, the operator can safely access the underside of the vehicle to swap out mower blades, replace spark plugs or drive belts, etc. When the work is completed, he simply removes the wheel chocks and wheel plates 82*a*, 82*b*, disengages locks 16*a*, 16*b*, then slowly drives the vehicle backwards causing frame assembly 12 with lift assembly 30 to pivot backwards and downwards, helping re-position the vehicle onto the ground.

When apparatus 10 or apparatus 70 is permanently or semipermanently installed in a machine shop, service station or the like, shorter webs 52*a*, 52*b* may be used with the apparatus. For a permanent or semipermanent installation, the forward ends of webs 52*a*, 52*b* can be attached to the floor by bolts, screws, lag screws, or other suitable fasteners. With respect to the above description of the invention, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing description is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Thus, it will be apparent to those skilled in the art that many changes and substitutions can be made to the preferred embodiment herein described without departing from the spirit and scope of the present invention as defined by the appended claims.

What is claimed is:

1. A lifting apparatus for use with a vehicle having forward wheels and rear wheels, said apparatus comprising:

frame means;

web means attached to said frame means, said web means positionable so that, as said wheels of said vehicle are driven over said web means, a weight of said vehicle on said web means deters slippage of said apparatus; and lift means pivotably attached to said frame means, said lift means adapted for receiving said forward wheels therein so that, when said forward wheels are secured in said lift means and said vehicle is driven forwards with said rear wheels on said web means, said lift means pivots from a down position to an up position wherein a forward end of said vehicle is raised above ground level.

2. The apparatus as recited in claim 1, wherein said frame means further comprises:

pair of spaced-apart supports, each of said supports having an upper end and a lower end;

a pair of spaced-apart, generally parallel side walls, each of said side walls attached to one of said supports;

a transverse bar attached to said pair of supports near said upper end; and a transverse base attached to said pair of supports at said lower end, said supports being pivotable between a first stable position wherein said lift means is in said down position and a second stable position wherein said lift means is in said up position.

3. The apparatus as recited in claim 1, wherein said web means further comprises a pair of spaced-apart webs attached to said frame means, said webs positioned to be extendable forwards of said apparatus.

4. The apparatus as recited in claim 1, further comprising means for adjusting a height of said apparatus.

5. The apparatus as recited in claim 1, further comprising means for adjusting a width of said apparatus.

6. The apparatus as recited in claim 1, further comprising wheel holder means operably connected to said lift means.

7. The apparatus as recited in claim 1, wherein said lift means further comprises a pair of spaced-apart chains, each of said chains adapted for securing a wheel of said vehicle thereto.

8. The apparatus as recited in claim 1, wherein said frame means and said lift means are made of metal.

9. The apparatus as recited in claim 1, wherein said lift means further comprises:

cradle means adapted for receiving a pair of wheels therein; and ramp means attached to said cradle means, said cradle means pivoting from said down position wherein a vehicle can be driven forwards on said ramp means until said forward wheels rest in said cradle means to said up position wherein said forward end is raised above ground level.

10. The apparatus as recited in claim 9, wherein said frame means further comprises:

a pair of spaced-apart supports, each of said supports having an upper end and a lower end;

a pair of spaced-apart, generally parallel side walls, each of said side walls attached to one of said supports;

a transverse bar attached to said pair of supports near said upper end; and a transverse base attached to said pair of supports at said lower end, said supports being pivotable between a first stable position wherein said lift means is in said down position and a second stable position wherein said lift means is in said up position; and wherein said cradle means further comprises a pair of spaced-apart cradles, each of said cradles pivotably attached to a different one of said side walls.

11. The apparatus as recited in claim 9, wherein said ramp means further comprises a pair of spaced-apart ramps attached to said cradle means.

12. A lifting apparatus for use with a vehicle having forward wheels and rear wheels, said apparatus comprising:

a frame assembly having a pair of spaced-apart, generally vertical supports, each of said vertical supports having an upper end and a lower end, said frame assembly being pivotable between a first stable position and a second stable position;

a pair of spaced-apart, generally parallel side walls, each of said side walls attached to one of said supports;

a pair of webs attached to said frame assembly, said webs extendable from said frame assembly and positionable so that, as the wheels of a vehicle are driven over said web means, a weight of said vehicle on said webs deters slippage of said apparatus;

a transverse bar pivoted between said side walls, said transverse bar being in a down position when said frame assembly is in said first stable position, said transverse bar being in an up position when said frame assembly is in said second stable position; and a pair of wheel holders operably connected to said transverse bar so that, when said forward wheels are secured in said wheel holders and said vehicle is driven forwards with said rear wheels on said webs, said frame assembly pivots from said first stable position to said second stable position, thereby raising a forward end of said vehicle.

13. The apparatus as recited in claim 12, further comprising means for adjusting a length of said vertical supports.

14. The apparatus as recited in claim 12, further comprising:

means for adjusting a width of said frame assembly; and means for adjusting a width of said transverse bar.

15. The apparatus as recited in claim 12, wherein said vertical supports, said side walls, said transverse bar, and said wheel holders are made of metal.

16. The apparatus as recited in claim 12, wherein said webs are made of fabric, rubber, vinyl, plastic, composition sheeting, rubber-impregnated fabric, vinyl-impregnated fabric, or combinations thereof.

17. The apparatus as recited in claim 12, further comprising a pair of rear supports, one of said rear supports attached to each of said vertical supports.

18. The apparatus as recited in claim 12, further comprising a pair of front supports, one of said front supports attached to each of said cradles.

19. The apparatus as recited in claim 12, wherein said pair of wheel holders further comprises:

a pair of spaced-apart cradles, each of said cradles attached to one end of said transverse bar; and a pair of ramps, each of said ramps attached to a forward end of one of said cradles, said webs positionable to underlie said ramps when said frame assembly is in said first stable position.

20. The apparatus as recited in claim 12, wherein said pair of wheel holders further comprises a pair of spaced-apart chains secured to said transverse bar, each of said chains operable to secure a wheel of said vehicle thereto.

21. A lifting apparatus for use with a vehicle having forward wheels and rear wheels, said apparatus comprising:

frame means;

web means attached to said frame means, said web means positionable so that, as said wheels of said vehicle are driven over said web means, a weight of said vehicle on said web means deters slippage of said apparatus; and lift means pivotably attached to said frame means, said lift means including cradle means adapted for receiving a pair of wheels therein, and ramp means attached to said cradle means, said cradle means pivoting from said down position wherein a vehicle can be driven forwards on said ramp means until said forward wheels rest in said cradle means to said up position wherein said forward end is raised above ground level, said lift means adapted for receiving said forward wheels therein so that, when said forward wheels are secured in said lift means and said vehicle is driven forwards with said rear wheels on said web means, said lift means pivots from a down position to an up position wherein a forward end of said vehicle is raised above ground level.

22. The apparatus as recited in claim 21, wherein said frame means further comprises:

a pair of spaced-apart supports, each of said supports having an upper end and a lower end;

a pair of spaced-apart, generally parallel side walls, each of said side walls attached to one of said supports;

a transverse bar attached to said pair of supports near said upper end; and a transverse bar attached to said pair of supports at said lower end, said supports being pivotable between a first stable position wherein said lift means is in said down position and a second stable position wherein said lift means is in said up position.

23. The apparatus as recited in claim 21, wherein said web means further comprises a pair of spaced-apart webs attached to said frame means, said webs positioned to be extendable forwards of said apparatus.

24. The apparatus as recited in claim 21, further comprising means for adjusting a height of said apparatus.

25. The apparatus as recited in claim 21, further comprising means for adjusting a width of said apparatus.

26. The apparatus as recited in claim 21, further comprising wheel holder means operably connected to said lift means.

27. The apparatus as recited in claim 21, wherein said frame means further comprises:

a pair of spaced-apart supports, each of said supports having an upper end and a lower end;

a pair of spaced-apart, generally parallel side walls, each of said side walls attached to one of said supports;

a transverse bar attached to said pair of supports near said upper end; and a transverse base attached to said pair of supports at said lower end, said supports being pivotable between a first stable position wherein said lift means is in said down position and a second stable position wherein said lift means is in said up position; and wherein said cradle means further comprises a pair of spaced-apart cradles, each of said cradles pivotably attached to a different one of said side walls.

28. The apparatus as recited in claim 27, wherein said ramp means further comprises a pair of spaced-apart ramps attached to said cradle means.

29. A lifting apparatus for use with a vehicle having forward wheels and rear wheels, said apparatus comprising:

frame means;

web means attached to said frame means, said web means positionable so that, as said wheels of said vehicle are driven over said web means, a weight of said vehicle on said web means deters slippage of said apparatus; and a pair of spaced-apart chains attached to said frame means, each of said chains adapted for securing a wheel of said vehicle thereto so that, when said forward wheels are secured by said chains and said vehicle is driven forwards with said rear wheels on said web means, said frame means pivots from a down position to an up position wherein a forward end of said vehicle is raised above ground level.

30. The apparatus as recited in claim 29, wherein said frame means further comprises:

a pair of spaced-apart supports, each of said supports having an upper end and a lower end;

a pair of spaced-apart, generally parallel side walls, each of said side walls attached to one of said supports;

a transverse bar attached to said pair of supports near said upper end; and a transverse base attached to said pair of supports at said lower end, said supports being pivotable between a first stable position wherein said frame means is in said down position and a second stable position wherein said frame means is in said up position.

31. The apparatus as recited in claim 29, wherein said web means further comprises a pair of spaced-apart webs attached to said frame means, said webs positioned to be extendable forwards of said apparatus.

32. The apparatus as recited in claim 29, further comprising means for adjusting a height of said apparatus.

33. The apparatus as recited in claim 29, further comprising means for adjusting a width of said apparatus.

* * * * *